United States Patent [19]
Wills

[11] Patent Number: 5,312,575
[45] Date of Patent: May 17, 1994

[54] MICROAGGLOMERATION OF IMPACT MODIFIERS

[75] Inventor: Morris C. Wills, Roebling, N.J.

[73] Assignee: Rohm and Haas Company, Philadelphia, Pa.

[21] Appl. No.: 973,600

[22] Filed: Nov. 9, 1992

Related U.S. Application Data

[62] Division of Ser. No. 746,013, Aug. 13, 1991, abandoned.

[51] Int. Cl.$^5$ .............. B29C 45/00; B29C 47/00; B29B 9/08
[52] U.S. Cl. .......................... 264/109; 264/5; 264/112; 264/117; 264/176.1; 264/328.18
[58] Field of Search .......... 264/5, 13, 112, 109, 264/117, 328.18, 176.1

[56] References Cited

U.S. PATENT DOCUMENTS

| | | | |
|---|---|---|---|
| 3,793,402 | 2/1974 | Owens . | |
| 4,120,833 | 10/1978 | Purvis et al. | 921/81 |
| 4,141,932 | 2/1979 | Butler | 260/880 |
| 4,265,939 | 5/1981 | Tebbens et al. | 427/222 |
| 4,375,532 | 3/1983 | Baer | 525/310 |
| 4,387,138 | 6/1983 | Gift | 428/407 |
| 4,393,172 | 7/1983 | Lindner et al. | 525/402 |
| 4,419,496 | 12/1983 | Henton et al. | 525/301 |
| 4,513,111 | 4/1985 | Kishida et al. | 524/458 |
| 4,792,490 | 12/1988 | Yasai et al. | 428/407 |
| 5,082,732 | 1/1992 | Ueda et al. | 428/402 |
| 5,174,938 | 12/1992 | Ito et al. | 264/112 |

FOREIGN PATENT DOCUMENTS

160285A3 4/1985 European Pat. Off. .
404972A1 6/1989 European Pat. Off. .

*Primary Examiner*—Mary Lynn Theisen

[57] ABSTRACT

Core/shell impact modifiers, useful in toughening poly(vinyl chloride) and other thermoplastics, are prepared at small particle sizes by an emulsion polymerization process, agglomerated by a novel technique which has little effect on emulsion solids, are further encapsulated by a final shell, and are isolated by spray-drying or coagulation. The isolated particles are readily re-dispersed to their original particle size in the matrix polymer.

16 Claims, 3 Drawing Sheets

COMPLETE BREAKDOWN TO THE ORIGINAL
60 NANOMETER ACRYLIC IMPACT
MODIFIER PARTICLE

ENCAPSULATION
METHYL METHACRYLATE

ORIGINAL ACRYLIC
IMPACT MODIFIER
60 NANOMETERS

METHYL
METHACRYLATE

BUTYL
ACRYLATE

MICROAGGLOMERATION OF IMPACT MODIFIERS

This application is a file-wrapper divisional of U.S. application Ser. No. 07/746,013, filed Aug. 13, 1991, now abandoned.

FIELD OF THE INVENTION

This invention relates to a process for preparing certain core/shell impact modifiers of small core particle size, to the core/shell impact modifiers so prepared, and to their blends with a variety of matrix thermoplastics.

BACKGROUND OF THE INVENTION

It has been known for over 20 years in the field of impact modifiers for poly(vinyl chloride) (PVC) that larger particle rubber cores sometimes are desirable for improved impact in core/shell impact-modified PVC. Especially with butadiene-based cores, it is a lengthy process to enlarge the particle size of the core by further polymerization of more butadiene (or copolymer of butadiene with styrene) in the presence of the core under conditions where no new particles are formed (the "grow-out" process), although such processes are readily accomplished with acrylic rubber cores. An alternate method is to agglomerate the rubber particles by what is essentially a controlled partial coagulation by adjustment of pH, salt content, and the like, so as to give a cluster of particles, which then are used as a substrate onto which is polymerized one or more hard stages or shells. The so-agglomerated rubber behaves in imparting impact and in optical microscopy in a manner similar to grow-out particles of similar particle size.

However, there are also reasons in impact modification of PVC to prepare core/shell impact modifiers wherein the rubber is of relatively low particle size. These reasons include systems, i.e., processed PVC compounds where high clarity is desired, or where it is desired to pigment the system with avoidance of a washed-out or pearlescent appearance. These reasons further include the field of acrylic-based impact modifiers, where surprisingly particle sizes in the range of 50 to 100 nm are effective modifiers. However, such systems involving small particle sizes, especially if high in rubber content, are difficult to prepare at high solids, and are difficult to isolate by means such as coagulation or spray-drying. Post-addition approaches or co-spray-drying approaches have been utilized, but often dilute the efficacy of the impact modifier.

Further, there are other thermoplastics where smaller particle rubbers are preferred for a particular balance of impact properties, processing, and surface appearance, such as those polymers which do not craze on impact, such as polyesters.

Thus the art has sought a means for preparing core/shell impact modifiers for PVC and other thermoplastics wherein the rubbery core content is high, wherein the particle size of the modifier is small, wherein the material can conveniently and inexpensively be isolated in powdery form, and wherein the polymer particles readily redisperse to the initial small particle size.

SUMMARY OF THE INVENTION

This invention relates to a process for preparing a core/shell impact modifier for poly(vinyl chloride) or other thermoplastics by forming a core/shell polymer of small particle size, agglomerating the core/shell polymer, and further encapsulating a number (more than one) of the original core/shell particles within one larger particle. After isolation of the core/shell impact modifier, on dispersing into a matrix polymer, the impact modifier is essentially redispersed to its original particle size. The invention further relates to an improved process for conducting the agglomeration step, to the resulting impact modifiers so formed, and to blends of the impact modifiers with a variety of matrix polymers, such as PVC.

DETAILED DESCRIPTION

The core/shell impact modifier comprises (a) a core of a rubbery polymer having a glass transition temperature below about −20° C., and a particle size below about 100 nm, the rubbery polymer being formed from at least 75 weight percent of units derived from butadiene, $C_2$ to $C_8$ lower alkyl esters of acrylic acid, or mixtures thereof. The core is formed in emulsion by conventional means and is comprised of at least 75 weight percent of butadiene, a $C_2$ to $C_8$ lower alkyl acrylate, such as ethyl acrylate, butyl acrylate, hexyl acrylate, octyl acrylate, or 2-ethylhexyl acrylate, and the like, or mixtures thereof. Thus copolymers of butadiene and butyl acrylate in any ratio would be encompassed as long as the total of the two monomers was at least 75% of the monomers polymerized to form the total core polymer. Preferred for purposes of good weathering and thermal stability are rubbery copolymers comprised of at least 80 weight percent of units derived from butyl acrylate; the remainder may include units derived from monomers such as alkyl methacrylates or vinyl aromatics. Especially preferred for purposes of better weathering and thermal stability is that the rubbery polymer be at least about 95 weight percent butyl acrylate, the other units being present being those derived from multi-unsaturated monomers.

Other monomers, such as isoprene, vinyl acetate, vinyl versatate, styrene, acidic monomers, such as methacrylic acid, alkyl methacrylates, such as 2-ethylhexyl methacrylate, isobutylene, and the like, may be present in the core polymer. The core polymer preferably contains units derived from at least one multi-unsaturated monomer, preferably in amounts from about 0.05 weight percent to about 5 weight percent, based on total monomers in the core. The multi-unsaturated monomer may be one in which the unsaturated groups are similar and of equal reactivity, such as in divinyl benzene, divinyl adipate, ethylene glycol dimethacrylate, butylene glycol diacrylate, trimethylolpropane trimethacrylate, and the like, or they may be dissimilar and of unequal reactivity, such as in diallyl maleate, allyl methacrylate, allyl acrylate, and the like. The value for particle size in the description of the invention is that value which provides an effective balance of clarity or translucency and impact strength. It is also chosen because it is experimentally much more difficult to form the final modifier with its unusual structure and morphology when the particle size of the core is larger than about 100 nanometers.

The core/shell impact modifier further comprises (b) an intermediate shell of polymer having a glass transition temperature above −20 degrees C., the intermediate shell being formed predominately, i.e., from about 50 weight percent to about 100 weight percent, from units derived from methyl methacrylate, the intermediate shell encapsulating the core polymer, the intermediate shell being from about 5% to about 20% by weight of the core/intermediate shell polymer particle. Thus the intermediate shell may be a homopolymer of methyl methacrylate, a copolymer of methyl methacrylate with a small amount, such as from about 1 to about 20 parts of an alkyl acrylate or an alkyl methacrylate, such as ethyl methacrylate or butyl acrylate, a copolymer of methyl methacrylate with styrene, a copolymer of methyl methacrylate with methacrylic acid, and the like, as long as the methyl methacrylate is greater than 50% by weight of the intermediate shell polymer. The intermediate shell polymer may be partially or totally attached to or grafted to the core polymer. It may further contain from about 0.05 weight percent to about 5 weight percent of one or more multi-unsaturated monomers, as defined above.

The ratio of core to intermediate shell is as defined to insure that the highest impact efficiency can be achieved whilst leaving a shell to act as a compatibilizing layer between the rubbery polymer and the matrix polymer. The use of a low level of intermediate shell means that the intermediate core/shell polymer will not have a particle size much larger than the original core particle.

The reaction conditions for formation of both the intermediate and final shells are those under which essentially no new polymer particles are formed. These conditions are well known, and generally relate to avoiding formation of new polymer particles in separate soap-stabilized micelles. Normally little or no new emulsifier is added, and the soap concentration is maintained below the critical micelle concentration, which is known or can be determined for most emulsifiers. Further, the use of highly water-soluble monomers is avoided, to avoid formation of separate particles. It is difficult specifically to define the conditions for each emulsion polymerization; a good rule is to test the further polymerization on a small scale, adding no additional emulsifier to a system already low in emulsifier; if the emulsion remains stable, then a larger reaction may be conducted.

The core/shell impact modifier further comprises (c) a final encapsulating shell of hard polymer of glass transition temperature at least 60 degrees C., the final encapsulating shell being formed predominately, i.e., from about 50 weight percent to about 100 weight percent, from units derived from methyl methacrylate, the final encapsulating shell comprising from about 5 to about 20% by weight of the core/shell impact modifier, the final encapsulating shell encapsulating more than one core/intermediate shell particles, and the final encapsulating shell forming a particle of at least 150 nm diameter. Thus the final encapsulating shell may be a homopolymer of methyl methacrylate, a copolymer of methyl methacrylate with a small amount of an alkyl acrylate or an alkyl methacrylate, such as ethyl methacrylate or butyl acrylate, a copolymer of methyl methacrylate with styrene, a copolymer of methyl methacrylate with methacrylic acid, and the like, as long as the methyl methacrylate is greater than 50% by weight of the intermediate shell polymer. The final encapsulating shell polymer may be partially or totally attached to or grafted to the core polymer, but it is preferred that it not be highly grafted or attached.

It is further preferred that the molecular weight of the final encapsulating polymer be of relatively high molecular weight, such as above about 100,000. Molecular weights which are very high, such as about 1,000,000 and above, of the final encapsulating polymer are difficult to obtain without attachment or grafting to the core or intermediate shell. Nevertheless, certain compositions having a quite high molecular weight of the final encapsulating shell may be useful for certain applications. The low level of final encapsulating shell polymer is chosen so as to dilute the rubber content as little as possible whilst still allowing isolation of the impact modifier with acceptable isolation rates and flow properties.

The total rubber content of the modifier after final encapsulation should be no more than about 86%, or effective redispersion cannot be accomplished, which would lead to a blend of modifier with PVC of poorer light transmission. This means that the total of all shell polymers must be at least about 14 weight percent of the total core/shell polymer.

The most unusual attribute of the new modifier is that the final shell encapsulates more than one particle. After the initial smaller particles are agglomerated, the final shell then can encompass several original particles within one shell. It is preferred that the final shell encapsulate at least ten of the original particles. The number of original particles encapsulated can be calculated from the geometry relationships of the initial core/intermediate shell particle, in that the volume of the final core/shell polymer will be approximately $(D_a/D_p)^3$ that of the core/intermediate shell particle, where $D_a$ and $D_p$ are the measured diameters of the core/intermediate shell particle and of the agglomerated core/intermediate shell/final shell particle, respectively.

The invention further comprises a process for preparing a core/shell impact modifier which comprises:

a) forming by emulsion polymerization a latex of rubbery polymer particles having a glass transition temperature below about $-20$ degrees C. and a particle size below about 100 nm diameter, the rubbery polymer particle being formed from at least 75 weight percent of units derived from butadiene, $C_2$ to $C_8$ lower alkyl esters of acrylic acid, or mixtures thereof;

b) forming by sequential emulsion polymerization in the presence of the latex of rubbery polymer particle, under conditions wherein essentially no new polymer particles are formed, a latex of first core/intermediate shell polymer particles, the intermediate polymer shell having a glass transition temperature above about $-20$ degrees C., the intermediate shell being formed predominately from units derived from methyl methacrylate, and the intermediate shell being from about 5% to about 20% by weight of the first core/intermediate shell polymer particles;

c) agglomerating the latex of first core/intermediate shell polymer particles to form a latex of agglomerated particles of at least 150 nm diameter, the solids content of the latex of first core/intermediate shell polymer particles being no higher than about 40 percent, and the solids content of the latex of agglomerated particles being no higher than about 30%;

d) forming an encapsulating shell of hard polymer having a glass transition temperature at least 60 degrees C. in a final core/shell polymer by sequential emulsion polymerization onto the agglomerated particles, under conditions wherein essentially no new polymer particles are formed, the encapsulating shell being formed predominately from units derived from methyl methacrylate, the encapsulating shell comprising from about 5 to about 20% by weight of the final core/shell polymers, the total shell content being no lower than about 14% by weight of the final core/shell polymer, the sequential emulsion polymerization being conducted in the latex of the agglomerated particles, and the final core/shell polymer remaining in latex form; and, if desired, e) isolating the final core/shell polymer.

BRIEF DESCRIPTION OF THE DRAWINGS

The process to be conducted is shown schematically in FIGS. 1A, 1B, 2-4, 5A and 5B, also labelled Steps 1-5.

PREFERRED EMBODIMENTS OF THE INVENTION

Figure 1A:
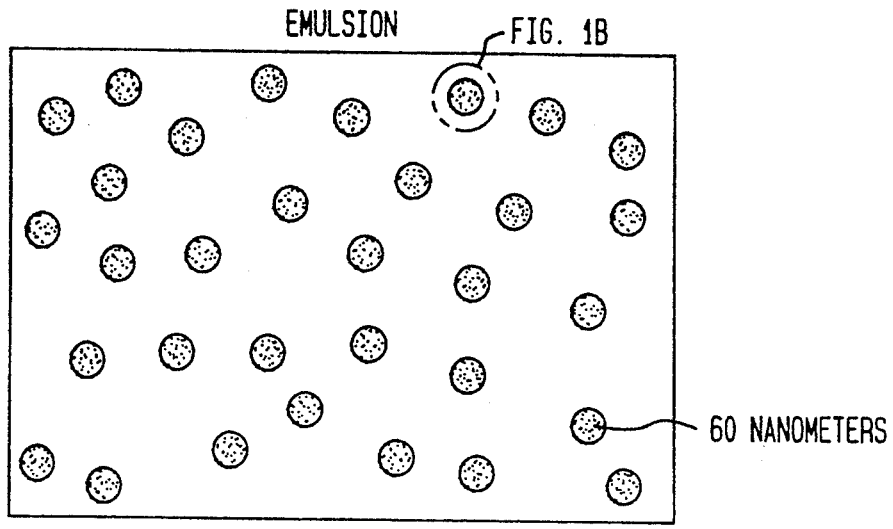
FIGS. 1A and B illustrate the emulsion of core/shell particles of a preferred embodiment with a crosslinked poly(butyl acrylate) core and a poly(methyl methacrylate) shell, the particle being non-agglomerated and of a particle size of 60 nanometers.
Figure 1B:
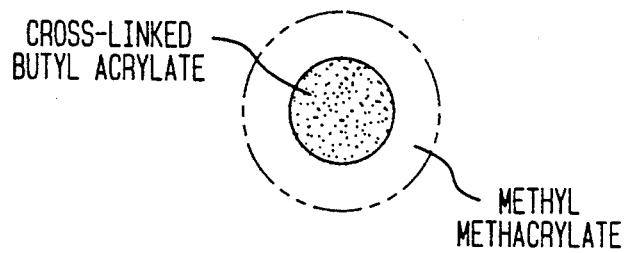
Figure 2:
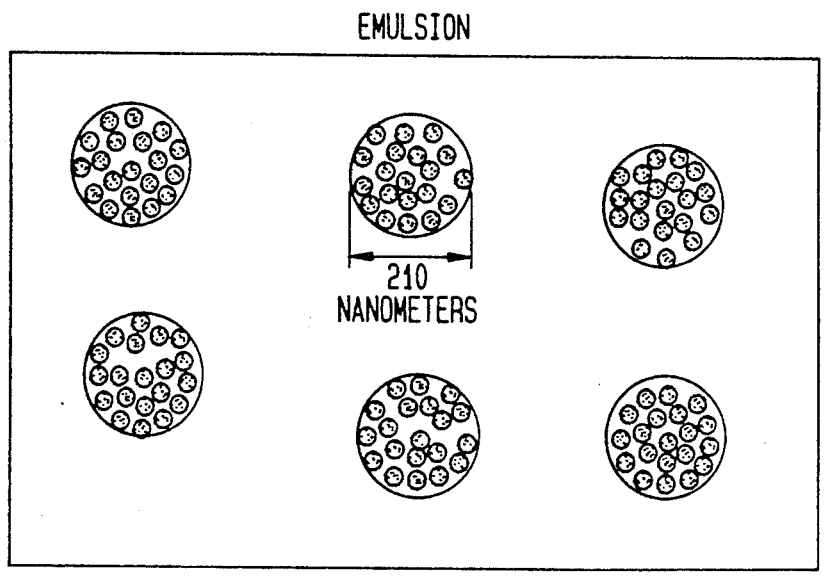
FIG. 2 illustrates the emulsion after micro-agglomeration into non-encapsulated particles of 210 nanometers.
Figure 3:
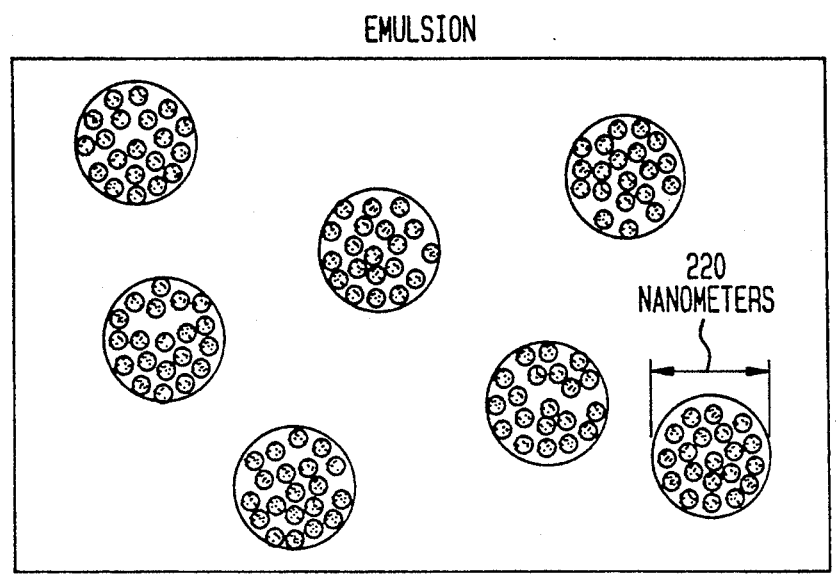
FIG. 3 illustrates the emulsion after the final shell of methyl methacrylate has been polymerized around the agglomerated particles.
Figure 4:
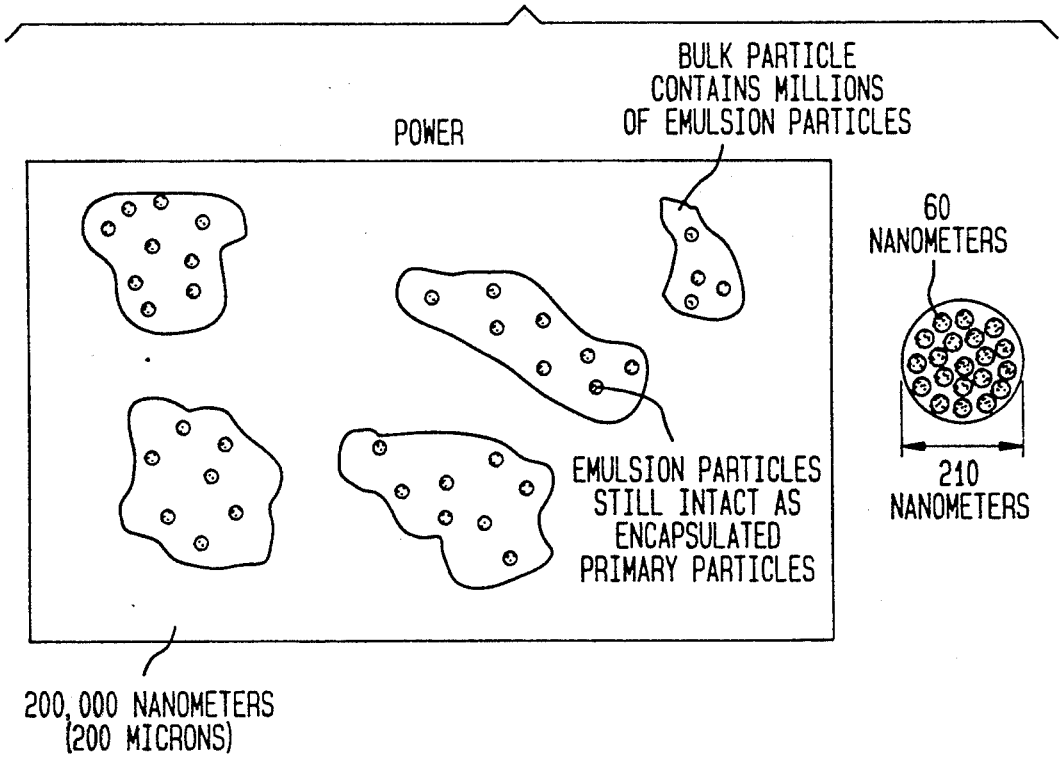
FIG. 4 illustrates the powder of the impact modified after isolation from emulsion, in which the bulk particles are of larger size and enfold many of the encapsulated micro-agglomerated core/shell particles.
Figure 5A:
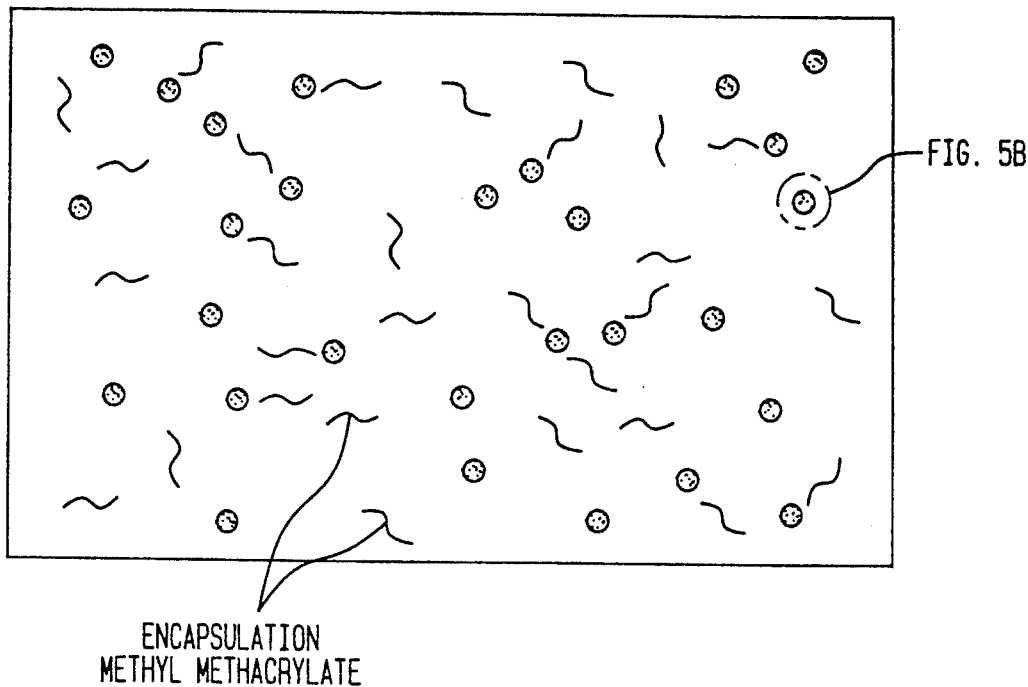
FIGS. 5A and B illustrate the poly(vinyl chloride) matrix after the bulk particles have been processed to remove the encapsulating final shell and form the original non-encapsulated, non-microagglomerated polymer particles in their original particle size.
Figure 5B:
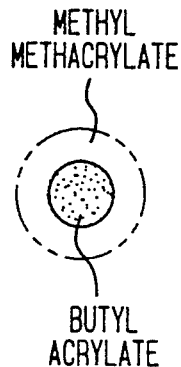

The isolation is preferably by spray-drying or coagulation, for cost purposes and to provide a particulate polymer. For ease of control of the polymer morphology, the coagulation is preferably accomplished by addition of an aqueous solution of a salt of an inorganic acid. A stabilizer containing one or more antioxidants and/or one or more more thermal stabilizers may be incorporated into the emulsion of the final core/shell polymer prior to isolation.

In this process, the rubbery polymer particle is preferably formed from at least 80% of units derived from n-butyl acrylate and the rubbery polymer particle contains units derived from a multi-unsaturated monomer, for better thermal and weathering stability and enhanced impact performance. The units derived from a multi-unsaturated monomer may have two or more unsaturated sites of equal reactivity, or of unequal reactivity.

For ease in controlling particle size and avoiding dilution of the latex, preferably agglomeration of the first core/intermediate shell latex is accomplished by addition of a dilute solution of an inorganic salt, more preferably by addition of separate streams of an aqueous solution of a weak base, such as ammonium hydroxide, and an aqueous solution of a weak acid, such as acetic acid.

The invention further comprises a process for preparing a toughened thermoplastic resin which comprises forming a final core/shell polymer by the process described above, and blending that final core/shell polymer with a thermoplastic resin under conditions of heat and shear sufficient to cause the final core/shell polymer to disperse into domains of particle size equivalent to those of the particles of the core/intermediate shell polymer or polymers prior to agglomeration. For convenience, it is preferred that the blending is accomplished in an extruder or on a heated multi-roll mill, and that the toughened thermoplastic resin is processed into a toughened article by extrusion or by injection molding.

In this process, the thermoplastic resin may be, among others, a homopolymer or copolymer of vinyl chloride, a homopolymer or copolymer of methyl methacrylate, or an engineering resin, such as a polyester of terephthalic acid and an aliphatic glycol, a polyamide, a polycarbonate, a polyglutarimide, an acrylonitrile-butadiene-styrene resin, or a blend of at least two of such resins.

The invention further encompasses articles formed from the blends of the novel core/shell polymers and the thermoplastic resins.

The reaction conditions by which the polymerization is run are known to the art. The initiators are those common to emulsion polymerization, such as persulfates, peresters, hydroperoxides, peracids, azo compounds, and the like. Some or all of the initiators may be combined with activators to form "redox" pairs. Such activators include sodium formaldehyde sulfoxylate, sodium metabisulfite, sodium hydrosulfite, and the like.

Surfactants may be chosen from a variety known to the emulsion art, such as alkali metal or ammonium salts of long-chain alkylsulfonic acids, long-chain alkylsulfates, derivatives of aromatic sulfonates, ethoxylated alkaryl phosphates, and the like. To accomplish the microagglomeration, it appears necessary that the emulsifier be the alkali metal or tetrasubstituted ammonium salt of a strong acid, and that emulsifiers based on weak acids, such as salts of fatty acids, are less effective. Preferred are sulfates and sulfonates, such as sodium lauryl sulfate, sodium dodecylbenzene sulfonate, potassium dodecylbenzene sulfonate, lauryl(ethoxy)sulfates and sulfonates, lauryl(polyethoxy)sulfates and sulfonates, alkaryl(polyethoxy)sulfates and sulfonates, and the like.

The microagglomeration may be conducted by addition of appropriate coagulants in limited amounts so as to bring the particles together without a total precipitation from the latex. Such can be accomplished by careful addition of salts such as sodium chloride, calcium chloride, and the like, or if the emulsion is stabilized with a soap with carboxylic acid groups, by addition of an appropriate acid. An effective means is to add separate streams of a weak acid and a weak base with rapid stirring so that the salt is formed in situ in a diluted form. The weak acid and weak base may be added as concentrated solutions, so the emulsion is diluted very little during the agglomeration step.

The weak acid and weak base should be water-soluble, and it is preferred that their salt be also. Suitable weak bases are ammonia, low molecular weight amines such as monomethyl amine, and the like. Ammonia is preferred. Suitable weak acid are carbon dioxide, sulfur dioxide, acetic acid, formic acid, propionic acid, and the like. Acetic acid is preferred.

On agglomerating the latex of first core/intermediate shell polymer particles to form a latex of agglomerated particles of at least 150 nm diameter, the solids content of the latex of first core/intermediate shell polymer particles should be no higher than about 40 percent, and if the addition method utilizing separate streams of a weak acid and a weak base be utilized, no higher than about 30%, and the solids content of the latex of agglomerated particles should be no higher than about 30%. Otherwise the mixtures become so viscous that stirring can disturbed and effective agglomeration cannot occur.

The reactions may be conducted by batch processes (monomer all present in the kettle), by addition of a series of "shots", or by gradual addition. A seed polymer may be separately made and added to control particle size, or the seed may be generated "in situ". The monomers may be added "neat", as pre-formed emulsions, or by use of an in-line emulsifier while being added to the reactor.

If desired, stabilizers and the like may be incorporated into the modifier prior to isolation or added to the modifier during or after isolation. For use in engineering resins where higher processing temperatures are encountered, thermal stabilizers such as triaryl phosphites, non-volatile hindered phenols, organosulfur compounds, such as long-chain mercaptoesters, and the like, may be added. For use in poly(vinyl chloride), if the components of the modifier are essentially all derived from (meth)acrylic esters, stabilization of the modifier is not necessary. If the rubbery particles contain above about 25 weight percent of butadiene, one or more stabilizers, such as hindered phenols, are conventionally added prior to isolation. The modifier may be isolated from emulsion by any of several well-known means. It may be admixed with hot matrix polymer on a mill or in an intensive mixer whilst still in emulsion form and the water flashed off. It is preferred it be separately isolated by conventional means, such as spray-drying, freeze-coagulation, salt-coagulation, methanol-coagulation, and the like, and then dried. It is preferred not to dry the polymer at temperatures which may fuse the modifier and delay redispersion, such as by pelletization by means of an extruder, although such methods may be used if conditions which avoid fusion are chosen.

After isolation, the impact modifier may be mixed with the appropriate matrix polymer at levels to obtain improvement in impact, which will generally be from about 3 to about 40 percent by weight of the toughened blend. The thermoplastic resin or matrix or polymer of the toughened blend may be one or more of many well-known thermoplastics known to accept impact modification from core/shell modifiers. The thermoplastic resin may be a homopolymer of vinyl chloride, a copolymer containing at least 80 weight percent of units derived from vinyl chloride, such as a vinyl chloride-vinyl acetate copolymer, a homopolymer of methyl methacrylate or a copolymer containing at least 80 weight percent of units derived from methyl methacrylate, such as a methyl methacrylate/ethyl acrylate or a methyl methacrylate/styrene copolymer. The thermoplastic resin may be an engineering resin, such as a polyester of terephthalic acid and an aliphatic glycol, a polyamide, a polycarbonate, a polyglutarimide, an acrylonitrile-butadiene-styrene resin, or a blend of at least two of such resins.

The toughened blend may further contain one or more of lubricant, processing aid, rheology modifier, dye, pigment, flame retardant, thermal stabilizer, antioxidant, antiozonant, ultraviolet stabilizer, mold release agent, reinforcing filler or non-reinforcing filler. The reinforcing filler may be least one of glass fibers, glass spheres, talc, or mica.

In the case of poly(vinyl chloride), the blend may also contain a heat distortion improver, such as a polyglutarimide. The impact modifier may be used in PVC with conventional stabilizers which may be selected depending on the degree of stability, color retention, lubricity, and weatherability required, such as organotin, organic lead, barium-cadmium, and calcium-zinc stabilizers.

The PVC blends containing the impact modifiers of the present invention may be used for production of extruded, injection molded, blow-molded and foamed articles of commerce, such as siding, especially for architectural uses, window shades, protective shading, window profiles, pipe and drainage uses, appliance housings, refrigerator liners and trays, bottles for packaging of liquids and solids, such as potable water, food oils, and the like, and for many other conventional uses.

The blends with engineering resins, such as a polyester of terephthalic acid and an aliphatic glycol, a polyamide, a polycarbonate, a polyglutarimide, an acrylonitrile-butadiene-styrene resin, or a blend of at least two of such resins, may be used for many applications where the engineering resin is already employed, but where further toughness is required, such as appliance housings, automotive parts, food packaging, such as trays, bottles, and the like, toys, furniture, and other well-known uses.

Blends with methyl methacrylate may be employed to give additional toughness to uses such as capstock, translucent or transparent glazing, molded articles, such as cups, taillights, and the like.

The following examples illustrate this invention.

EXAMPLES

The first two examples describe the preparation of a core/shell polymer of butyl acrylate/methyl methacrylate of particle size 140 nm (Example 1), contrasted with the preparation of a smaller particle size material (70 nm) of similar composition (Example 2), the smaller particle size being accomplished by control of the addition of emulsifier. Particle sizes are measured on a BI90 particle size tester.

EXAMPLE 1

Preparation of a Core/Intermediate Shell Polymer of Particle Size ca. 140 nm Stage A: Preparation of Core To a five-liter reaction vessel equipped with stirrer, reflux condenser, means for measuring temperature of the contents, means for heating and cooling contents, means for adding nitrogen, and means for adding reaction components, was charged 1560 parts of deionized water, which was heated to 55 degrees C. whilst sweeping with nitrogen. A dilute solution of PNP (p-nitrosophenol) was added (0.002% on monomers), then a dilute solution of tartaric acid (0.02% on monomers), then an aqueous solution of sodium lauryl sulfate (2.89 parts of a 25% solution, 0.05% on monomers).

Separately was prepared an emulsified monomer mix (EMM) of 371.15 parts water (plus a 100 ml. rinse), 10.08 parts of a 25% aqueous solution of sodium lauryl sulfate (SLS), 1437.82 parts of butyl acrylate, and 10.15 parts of allyl methacrylate. To the reactor was added 11.11% (203.26 parts) of the EMM, followed by 0.26 parts t-butylhydroperoxide (t-BHP), followed by 1.5 grams (0.107% on monomer) of sodium formaldehyde sulfoxylate (SFS) in 29.64 parts water. After addition of the first portion of the EMM to the reactor, to the remaining EMM was added 11.24 grams additional of sodium lauryl sulfate as an aqueous solution. Combining any rinse water, 56.74 parts of water were added with the SLS.

The temperature of the reactor contents was measured; when the exotherm had been reached, a 15 minute hold period was commenced, then the reactor was cooled to 53 degrees C. A second addition of EMM (168.5 parts) and t-butyl hydroperoxide (0.2 parts) was made, and the exotherm/hold/cool cycle repeated, followed by a third addition of EMM (758.4 parts) and t-BHP (0.92 parts), repetition of the exotherm/hold-/cool cycle. Upon cooling to 57 degrees C., the final addition of EMM (758.4 parts) and t-BHP (0.92 parts) was made, and the reaction allowed to exotherm. Upon reaching exotherm, a three-minute hold period was followed by an addition of 0.24 parts of t-BHP, then 0.16 parts of SFS in 9.9 parts water. The reaction was held one hour, then cooled to 53 degrees C. and the addition of the intermediate shell stage begun. Stage B: Preparation of Intermediate Shell To the emulsion containing the poly(butyl acrylate) particles was added 1.97 parts of SLS and 46.3 parts of water. After stirring for five minutes, a mixture of methyl methacrylate (197.45 parts) and n-dodecyl mercaptan (0.77 parts) were added, followed by 132.5 parts rinse water. Stirring at 53 degrees C. was continued for 10 minutes, then SFS (0.22 parts) with 26.5 parts water were added, stirred for three minutes, then 0.29 parts of sodium persulfate were added with 26.5 parts water. After exotherm was complete, 0.07 parts of SFS, 0.1 parts of sodium persulfate and 53 parts of water were added. Temperature was maintained for one hour, and then completed reaction cooled and filtered through a coarse filter to remove any gel.

EXAMPLE 2

Preparation of a Core/Intermediate Shell Polymer of Particle Size 70 nm Stage A: Preparation of Core To a five-liter reaction vessel equipped with stirrer, reflux condenser, means for measuring temperature of the contents, means for heating and cooling contents, means for adding nitrogen, and means for adding reaction components, was charged 1560 parts of deionized water, which was heated to 55 degrees C. whilst sweeping with nitrogen. A dilute solution of PNP (p-nitrosophenol) was added (0.002% on monomers), then a dilute solution of tartaric acid (0.02% on monomers), then an aqueous solution of sodium lauryl sulfate (49.7 parts of a 25% solution, 0.826% on monomers).

Separately was prepared an emulsified monomer mix (EMM) of 371.15 parts water (plus a 100 ml. rinse), 10.08 parts of a 25% aqueous solution of sodium lauryl sulfate (SLS), 1437.82 parts of butyl acrylate, and 10.15 parts of allyl methacrylate. To the reactor was added 11.11% (203.26 parts) of the EMM, followed by 0.26 parts t-butylhydroperoxide (t-BHP), followed by 1.5 grams (0.107% on monomer) of sodium formaldehyde sulfoxylate (SFS) in 29.64 parts water. The temperature of the reactor contents was measured; when the exotherm had been reached, a 15 minute hold period was commenced, then the reactor was cooled to 53 degrees C. A second addition of EMM (168.5 parts) and t-butyl hydroperoxide (0.2 parts) was made, and the exotherm/hold/cool cycle repeated, followed by a third addition of EMM (758.4 parts) and t-BHP (0.92 parts), repetition of the exotherm/hold/cool cycle. Upon cooling to 57 degrees C., the final addition of EMM (758.4 parts) and t-BHP (0.92 parts) was made, and the reaction allowed to exotherm. Upon reaching exotherm, a three-minute hold period was followed by an addition of 0.24 parts of t-BHP, then 0.16 parts of SFS in 9.9 parts water. The reaction was held one hour, then cooled to 53 degrees C. and the addition of the intermediate shell stage begun. Stage B: Preparation of Shell To the emulsion containing the poly(butyl acrylate) particles was added 1.97 parts of SLS and 46.3 parts of water. After stirring for five minutes, a mixture of methyl methacrylate (197.45 parts) and n-dodecyl mercaptan (0.77 parts) were added, followed by 132.5 parts rinse water. Stirring at 53 degrees C. was continued for 10 minutes, then SFS (0.22 parts) with 26.5 parts water were added, stirred for three minutes, then 0.29 parts of sodium persulfate were added with 26.5 parts water. After exotherm was complete, 0.07 parts of SFS, 0.1 parts of sodium persulfate and 53 parts of water were added. Temperature was maintained for one hour, and then the completed reaction cooled and filtered through a coarse filter to remove any gel.

EXAMPLE 3

Preparation of Core/Intermediate Shell Latices

In a manner similar to Example 2, the core/intermediate shell latices designated 3-A to 3-P were prepared. The remaining latices were prepared by a variant of the method of Example 1 wherein the exact amount of surfactant was adjusted to control the particle size.

In the following table, SLS is sodium lauryl sulfate, the shell thickness is calculated from the core particle size, the amount of intermediate shell polymer formed, and the assumption that layering was uniform of the shell.

| Primary Small Particle Size Core/Shell Emulsion Samples, Controls and Samples Made for Comparison | | | | |
|---|---|---|---|---|
| Number | Emulsion Rubber Level | Particle Size | Shell Thickness | SLS Soap Level | Solids Percent |
| 3-A | 88% | 90 nm | 3 nm | 0.7% | 41.6 |
| 3-B | 75% | 64 nm | 3 nm | 3.0% | 31.5 |
| 3-C | 100% | 63 nm | 0 nm | 3.0% | 31.7 |
| 3-D | 91% | 65 nm | 1 nm | 2.7% | 31.5 |
| 3-E | 76% | 69 nm | 3 nm | 2.3% | 31.4 |
| 3-F | 64% | 67 nm | 5 nm | 1.9% | 31.7 |
| 3-G | 91% | 62 nm | 1 nm | 2.7% | 30.9 |
| 3-H | 100% | 73 nm | 0 nm | 3.0% | 30.4 |
| 3-I | 76% | 71 nm | 3 nm | 2.3% | 31.1 |
| 3-J | 83% | 73 nm | 2.3 nm | 2.5% | 31.4 |
| 3-K | 91% | 73 nm | 1.1 nm | 2.7% | 31.5 |
| 3-L | 91% | 73 nm | 1.1 nm | 2.7% | 31.5 |
| 3-M | 88% | 76 nm | 1.6 nm | 1.0% | 39.1 |
| 3-N | 88% | 64 nm | 1.3 nm | 1.0% | 30.5 |
| 3-O | 88% | 72 nm | 1.5 nm | 1.0% | 29.8 |
| 3-P | 88% | 75 nm | 1.6 nm | 1.0% | 28.9 |
| COMPARATIVE SAMPLES (a) | | | | | |
| 3-Q | 91% | 216 nm | 3.3 nm | 1.0% | 42.5 |
| 3-R | 88% | 204 nm | 4.3 nm | 1.0 | 39.3 |
| 3-S | 86% | 221 nm | 5.5 nm | 1.0% | 42.6 |
| 3-T | 83% | 224 nm | 6.9 nm | 1.0% | 42.6 |
| 3-U | 76% | 227 nm | 10.3 nm | 1.0% | 42.8 |
| 3-V | 88% | 145 nm | 3.0 nm | 1.0% | 39.0 |

(a) These samples are made by the process of Example 1, but with no additional emulsifier added in the first operation to form the core, and the emulsifier re-distributed throughout the subsequent charges so the same overall weight of emulsifier is present at the end of the core polymerization.

EXAMPLE 4

Process for Microagglomeration of a Small Particle Size Core/Intermediate Shell Latex This example relates to the agglomeration of a small particle size emulsion, such as that formed in Example 2, to form a larger size agglomerated latex suitable for further encapsulation.

The latex of example 2 (750 parts) was charged to a reaction vessel equipped with means for external heating, for stirring, and for addition of separate streams of ammonia and acetic acid. In this example, the agglomerating agents were added incrementally. The latex was heated to 90 degrees C. The ammonia was added as a 29.3 weight percent solution (typical analysis of commercial ammonium hydroxide). The acetic acid was a 50 weight percent solution in deionized water.

A calculation is performed to determine what volumes of both solutions were needed to satisfy the following criteria: (a) a stoichiometric amount of $NH_3$ and acetic acid present at all times; (b) total concentration of salt formed in each incremental addition equal to 0.05% ammonium acetate based on the total weight of solution. (A SAS program was written which calculates A and B and every other conceivable quantity involved in this process. One needs only to enter the exact solids and weight of emulsion being used) Then at five minute intervals, these volumes were added to the stirred 90 C. emulsion using either syringes or volumetric burets. Samples were taken and the BI90 particle size (PS) determined. The addition of the feeds was stopped when the desired final PS was achieved (usually 200 to 250 nm). When the latex of Example 2 was microagglomerated, the particle size was 247 nm.

EXAMPLE 5

Continuous Microagglomeration

This example illustrates continuous microagglomeration of the intermediate core/shell latex. The process of Example 4 was followed, except the feed lines for ammonia and acetic acid were supplied by syringe pumps. Calculations were made to determine what volumetric flowrates of both solutions were needed to satisfy the following criteria:

(a) A stoichiometric amount of $NH_3$ and acetic acid present at all times;

(b) the total concentration of salt formed during 5 minutes of feed time to be equal to 0.05% ammonium acetate based on the total weight of solution. The pumps were then used continuously to feed the solutions to the stirred 90 C. emulsion. Sampling for particle size and termination of the feeds was conducted as in Example 4.

EXAMPLE 6

Microagglomeration of the Latices of Example 3

These examples illustrate microagglomeration of various core/intermediate shell samples from Example 3. The data show the agglomeration conditions, the final solids, the amount of salt (usually ammonium acetate formed in situ) used, gel levels and soap content. Note the low level of dilution of solids when ammonium acetate was used, relative to dilute sodium chloride in 6-A. Ammonium acetate was removed on determining solids by evaporation to dryness. All agglomerations were conducted at about 90 degrees C.

| Primary Emulsion | Agglom. Emulsion | Part. Size, nm | Microagg. Agent | Ending Solids % | Salt Level % | Gel Level % | Soap SLS % |
|---|---|---|---|---|---|---|---|
| 3-A | 6-A | 180 nm | 1% NaCl | 30.0 | 0.93 | 1.0 | 0.7 |
| 3-B | 6-B | 211 nm | AcOH/NH$_3$ | 30.2 | 3.9 | 0.9 | 3.0 |
| 3-C | 6-C | 210 nm | AcOH/NH$_3$ | 29.0 | 11.6 | 0.2 | 3.0 |
| 3-C | 6-C-2 | 206 nm | AcOH/NH$_3$ | 28.6 | 14.4 | ND | 3.0 |
| 3-D | 6-D | 218 nm | AcOH/NH$_3$ | 29.5 | 9.0 | ND | 2.7 |
| 3-E | 6-E | 246 nm | AcOH/NH$_3$ | 30.3 | 5.4 | 0.4 | 2.3 |
| 3-G | 6-G | 239 nm | AcOH/NH$_3$ | 29.9 | 8.7 | 0.2 | 2.7 |
| 3-L | 6-L | 225 nm | AcOH/NH$_3$ | 30.9 | 5.2 | 0.1 | 2.7 |
| 3-M | 6-M | Gelled | | | | | |
| 3-N | 6-N | 232 nm | AcOH/NH$_3$ | 30.0 | 2.5 | 0.3 | 1.0 |
| 3-O | 6-O | 265 nm | AcOH/NH$_3$ | 29.2 | 2.4 | 2.5 | 1.0 |
| 3-P | 6-P | 247 nm | AcOH/NH$_3$ | 29.5 | 2.7 | 0.5 | 1.0 |

EXAMPLE 7

Studies of Microagglomeration of Larger Particle Size Core/Intermediate Shell Latices Several attempts were made to microagglomerate emulsions 3-R and 3-V with ammonium acetate or dilute sodium chloride in the manner shown above. No increase in particle size was seen; when a level of 5.1% ammonium acetate was reached, the emulsion coagulated.

EXAMPLE 8

Process of Preparing the Final Shell Polymer on a Microagglomerated Core/Intermediate Shell Latex This example illustrates the procedure whereby the agglomerated intermediate core/shell polymer is further treated to polymerize the final shell. In most cases, the shell is of a minimum weight sufficient to protect the microagglomerated polymer during isolation and processing into the PVC or other thermoplastic.

An emulsion (Example 3-N), similar to that of Example 2, but of particle size 64 nm. before agglomeration, was agglomerated as shown in Example 5, using 3000 parts of emulsion, 2.14 parts of acetic acid solution, and 1.19 parts of aqueous ammonia. Fifteen incremental additions were required to achieve a particle size of 232 nm. The emulsion was sample 6-N.

In a reactor similar to that used for the initial core/intermediate shell preparation was charged 1200 parts of the 30% solids agglomerated emulsion and 1.4 parts of 25% sodium lauryl sulfate in 15 parts water. The mixture was heated to 53 degrees C., 35.51 parts of methyl methacrylate and 0.14 parts of n-dodecyl mercaptan were added, the mixture stirred for 10 minutes, 0.1 part of SFS with 10 parts of water added, the mix stirred 3 minutes more. 0.1 part of sodium persulfate added with 10 parts of rinse water, and the mixture allowed to exotherm. As soon as the temperature begins to drop, 0.04 parts of a 75% solution of SFS in water was added, followed by 10 parts of water rinse, 0.04 parts of sodium persulfate, and 10 parts of water rinse. The mixture was stirred for one hour, cooled, and drained through cheesecloth. The sample is Example 9-N.

EXAMPLE 9

Polymers of Core/Intermediate Shell/Final Shell Structure

In the manner described in Example 8, final shells of PMMA were polymerized onto the agglomerated core-/intermediate shell polymers of Example 6. The table shows the rubber level of the core/intermediate shell polymer prior to agglomeration and polymerization of the final shell, the additional amount of shell polymer, the total of thicknesses intermediate and final shell (the values are calculated and some rounding-off has occurred), and the final rubber content after final shell incorporation.

| Encapsulation of Microagglomerated Small PS AIM Emulsions | | | | | | | | |
|---|---|---|---|---|---|---|---|---|
| PRIMARY EMULSION | | | MICRO-AGGLO-MERATED EMULSION | | ENCAPSULATED EMULSION | | | |
| Example Number | Rub. Lev. | PS | * | Example Number | PS | Example Number | PS | SHELL Add/Tot | Total Rub % |
| 3-A | 88% | 90 | 2 | 6-A | 180 | 9-A | 180 | 1.9/3.9 | 82.5 |
| 3-B | 75% | 64 | 3 | 6-B | 211 | 9-B | 211 | 5/8 | 65.5 |
| 3-C | 100% | 63 | 0 | 6-C | 210 | 9-C | 238 | 3/3 | 92.0 |
| 3-C | 100% | 63 | 0 | 6-C-2 | 206 | 9-C-2 | 250 | 5/5 | 87.0 |
| 3-D | 91% | 65 | 1 | 6-D | 218 | 9-D | 230 | 2/3 | 86.0 |
| 3-D | 91% | 65 | 1 | 6-D | 218 | 9-D-2 | 226 | 4/5 | 86.0 |
| 3-E | 76% | 69 | 3 | 6-E | 246 | 9-E | 252 | 2/5 | 72.0 |
| 3-L | 91% | 73 | 1 | 6-L | 225 | 9-L | 229 | 3/3 | 85.5 |
| 3-N | 88% | 64 | 1.3 | 6-N | 232 | 9-N | 232 | 3.7/4.9 | 80.0 |
| 3-N | 88% | 64 | 1.3 | 6-N | 232 | 9-N-2 | 235 | 3.7/4.9 | 80.0 |
| 3-O | 88% | 72 | 1.5 | 6-O | 265 | 9-O | 277 | 4.8/6.2 | 79.2 |

*Shell thickness (nm) of initial shell

EXAMPLE 10

Test for Determination of Best Coagulation Conditions for Microagglomerated Latices In this example is shown how coagulation conditions are determined. In a one-ounce (30 ml.) vial was placed 7.5 grams of a 30% solids emulsion; in a second was placed 1.5 grams of a 0.475% calcium chloride solution. The temperature of both were raised simultaneously, the emulsion poured into the coagulant, shaken for one minute, and allowed to settle. The visual appearance of the coagulated emulsion was measured on an arbitrary scale from no coagulation to very large lumps, and the best rating is assigned to particles of size about 200 microns. From this test, the best coagulation temperature can be approximated. By this test, confirmed by actual isolation testing, the microagglomerated samples more readily coagulated easily into free-flowing filterable powders than their non-microagglomerated counterparts of similar composition.

Most samples are isolated by a batch coagulation method, using the same calcium chloride solution and a temperature about 5 degrees C. lower than that determined for the one-ounce vial test. To 1200 parts of 0.475% calcium chloride solution heated to the chosen temperature was added 600 parts of a 30% solids emulsion pre-heated to the same temperature. With stirring, the emulsion was added to the coagulant over a one-minute period, stirred fifteen minutes more, optionally cooled, and the precipitate filtered and washed with water. Drying was accomplished under vacuum with mild heating.

EXAMPLE 11

Test of Dispersibility in Poly(vinyl Chloride) (PVC)

This Example describes how the dispersion of microagglomerated samples in PVC was measured to demonstrate that the impact modifier particles were dispersed into sizes equal to that of the original core. Plaques of the modifier milled into PVC in a formulation also containing titanium dioxide of particle size ca. 250 nm were measured by transmission electron microscopy, no additional staining being used.

Modifiers are tested in a PVC formulation typical of European window profiles. The formulation is milled, compression molded, and submitted for Notched Izod impact testing. The key result is the percentage of samples that break in a ductile, rather than brittle, manner during the impact test.

| TSSF (Twin Screw Siding Formulation) | |
|---|---|
| Component | Parts per hundred of PVC (phr) |
| GEON (R) PVC | 100 |
| TM-181 organotin stabilizer | 1.6 |
| Calcium stearate lubricant | 1.3 |
| Wax XL-165 paraffin-type wax | 1.0 |
| Acrylic polymeric lubricating-processing aid (a) | 1.0 |
| Acrylic polymeric processing aid (b) | 0.5 |
| TiO$_2$ | 10.0 |

(a) Paraloid (R) K-175: butyl acrylate/styrene/methyl methacrylate terpolymer
(b) Paraloid (R) K-120N: methyl methacrylate/ethyl acrylate copolymer of MW > 1,000,000
Milling conditions: All stocks were milled at 180° C. for a total of 4 minutes on a two-roll oil-heated mill
Press conditions: Pressing was done at 180° C. and <1/68/68 metric tons pressure, using a 3'/2'/cool cycle.
Notched Izod: Determined according to ASTM D-256-84, Method A, with a 10-mil (0.25 cm.) notch radius.

From the Table, it can be seen that most microagglomerated samples dispersed well and gave the particle size of the original core. Sample 9-C and 9-C-2, mostly rubber, did not disperse to the original particle size. In the table rubber means there was no intermediate or final shell, primary that there was no microagglomeration after formation of the intermediate shell, MICRO, that the sample was microagglomerated but no final shell was polymerized, and ENCAPS meant all operations of intermediate shell formation, microagglomeration, and final shell formation were conducted.

| Example | Type of Sample | Emulsion BI90 PS nm | Overall Rubber % | Total Shell nm | DESCRIPTION OF TEM PHOTOGRAPH |
|---|---|---|---|---|---|
| Example 1 | Control | 145 | 88% | 3.0 | Well Dispersed 145 nm Modif. |
| 9-A | ENCAPS | 180 | 82.5% | 3.9 | Well Dispersed 94 nm Modif. |
| 3-C | RUBBER | 63 | 100% | 0 | Poor Disp. Large Mod. Domains |
| 3-D | PRIMARY | 65 | 91% | 1 | Well Dispersed 65 nm Modif. |
| 3-E | PRIMARY | 69 | 76% | 3 | Well Dispersed 69 nm Modif. |
| 3-F | PRIMARY | 67 | 64% | 5 | Well Dispersed 67 nm Modif. |
| 6-C | MICRO | 210 | 100% | 0 | Poor Disp. Large Mod. Domains |
| 6-D | MICRO | 218 | 91% | 1 | Well Dispersed 65 nm Modif. |
| 6-E | MICRO | 246 | 76% | 3 | Well Dispersed 69 nm Modif. |
| 9-C | ENCAPS | 238 | 92.0% | 3 | Poor Disp. Elongated Modif. |
| 9-C-2 | ENCAPS | 250 | 87.0% | 5 | Poor Disp. Elongated Modif. |
| 9-D | ENCAPS | 230 | 86.0% | 3 | Well Dispersed 65 nm Modif. |
| 9-D-2 | ENCAPS | 226 | 86.0% | 5 | Well Dispersed 65 nm Modif. |
| 9-E | ENCAPS | 252 | 72.0% | 5 | Well Dispersed 69 nm Modif. |

EXAMPLE 12

Impact Results in PVC Blends

This example discusses impact results in PVC blends. In general, the microagglomerated polymers impart about similar impact performance in PVC to their non-microagglomerated counterparts of similar core//shell ratios. The small particle size of each core particle does not detract noticeably from the impact strength relative to a larger "grow-out" core.

| Sample | | Impact @ 15 C # Ductile-10 bars/ Kg-cm/cm of notch | |
|---|---|---|---|
| | | 6 PHR | 7 PHR |
| Example 3-V | 88//12 145 nm | 10/125 | 10/141 |
| Example 9-A | 82.5//17.5 181 nm* | 9/109 | 10/136 |

*Microagglomerated from 90 nm and encapsulated

The following represent comparisons at 6 phr in the TSSF formulation. The descriptions are as in Example 11. DCBk is number of ductile breaks/10 samples; Impact is in Kg-Cm/Cm. * indicates some delamination.

glomerated impact modifiers of the present invention. The samples were milled into a clear PVC formulation, which is a proprietary non-pigmented formulation containing stabilizers, lubricant, processing aid, and PVC, but no impact modifier, to determine dispersion and particle breakdown. The test is based on the fact that small emulsion particle sized emulsions yield translucent plaques while larger emulsion particle size (140 nm to 350 nm) yield very opaque plaques. Thus, if the microagglomerated and/or encapsulated particles break down and disperse into primary small particles (70 nm) the plaques are translucent, if not they will be opaque. The processing on the mill and pressing of plaques is as in Example 11, except for the change in masterbatch. This test is a simple visual test. For some samples Hunterlab haze and total white light (Y-value) measurements were done. The test methods are well-known ASTM methods: D 1746 for TWLT, D 1003 for haze, and D 1925 for yellowness index. The table shows the visual clarity analysis and Hunterlab numbers for a variety of primary, microagglomerated, and encapsulated samples.

It will be noted that certain microagglomerated samples with very low overall shell contents do not redisperse as readily (samples 9-C, 9-C-2, and 9-D), but otherwise both samples microagglomerated without a final shell (but with an intermediate shell) and those microagglomerated plus final shell show excellent breakdown back to the primary particles.

| Example | Composition | PS | Shell | T = 12 C DCBk/Impact | 15 C DCBk/Impact | 19C DCBk/Impact |
|---|---|---|---|---|---|---|
| 9-C | ENCAP 92//8 | 216 | 3 | *8 90 | *10/122 | *10/124 |
| 9-C-2 | ENCAP 87//13 | 216 | 5 | *7 76 | 10/121 | 10/122 |
| 3-D | PRIM 91//9 | 65 | 1 | 9 181 | 10/125 | 10/128 |
| 6-D | MICRO 91//9 | 218 | 1 | 6 76 | 10/131 | 10/134 |
| 9-D | ENCAP 86//14 | 222 | 3 | 5 60 | 9/107 | 10/125 |

EXAMPLE 13

Clarity Studies in PVC Blends

This example illustrates the improved clarity brought about at essentially equivalent impact from the microag-

| Example # | Type of Sample | Emulsion BI90 PS nm | Overall Rubber % | Total Shell | Visual Rating nm | Hunterlab Y value | Hunterlab % Haze |
|---|---|---|---|---|---|---|---|
| Masterbatch PVC control | | | | | CLEAR | 67 | 9 |
| 3-A | PRIMARY | 90 | 88% | 2 | Semi translucent | x | x |
| 3-B | PRIMARY | 64 | 75% | 3 | Very translucent | 30 | 60 |
| 3-C | RUBBER | 63 | 100% | 0 | OPAQUE | 9 | 100 |
| 3-D | PRIMARY | 65 | 91% | 1 | Semi translucent | 18 | 88 |
| 3-E | PRIMARY | 69 | 76% | 3 | translucent | 25 | 80 |
| 3-F | PRIMARY | 67 | 64% | 5 | Very translucent | 28 | 65 |
| 3-N | PRIMARY | 64 | 88% | 1.3 | Translucent | x | x |
| 3-R | PRIMARY | 204 | 88% | 4.3 | OPAQUE | x | x |

| Example # | Type of Sample | Emulsion BI90 PS nm | Overall Rubber % | Total Shell | Visual Rating nm | Hunterlab Y value | Hunterlab % Haze |
| --- | --- | --- | --- | --- | --- | --- | --- |
| 3-V | PRIMARY | 145 | 88% | 3.0 | OPAQUE | 10 | 100 |
| 6-C | MICRO | 210 | 100% | 0 | OPAQUE | 7 | 100 |
| 6-D | MICRO | 218 | 91% | 1 | Semi translucent | 17 | 92 |
| 6-E | MICRO | 246 | 76% | 3 | Very translucent | 26 | 66 |
| 9-A | ENCAPS | 180 | 82.5% | 3.9 | Semi translucent | 21 | 84 |
| 9-B | ENCAPS | 211 | 65.5% | 8 | Very translucent | 20 | 60 |
| 9-C | ENCAPS | 238 | 92.0% | 3 | OPAQUE | 8 | 100 |
| 9-C-2 | ENCAPS | 250 | 87.0% | 5 | OPAQUE | 10 | 100 |
| 9-D | ENCAPS | 230 | 86.0% | 3 | OPAQUE | 12 | 100 |
| 9-D-2 | ENCAPS | 226 | 86.0% | 5 | Semi translucent | 16 | 94 |
| 9-E | ENCAPS | 252 | 72.0% | 5 | translucent | 23 | 76 | x = not measured
Very translucent means haze value below 70%

EXAMPLE 14

Color Studies in a Black PVC Formulation

This example shows the improved color in a black PVC formulation imparted by the microagglomerated impact modifiers. Again the formulation is a proprietary PVC formulation containing PVC, stabilizers, lubricants, and a black pigment. A control with no impact modifier will have a clear, shiny, black appearance with no mottling or pearlescence. Injection molded plaques of 3.2 mm. thickness were molded and were tested for blackness using the Hunterlab Colorimeter. The number reported is the L-value. The lower the L-value the more black is the sample. Some modifiers make the sample look grayish, and this is an undesirable property. Sample D-200 is a commercial impact modifier of small particle size, containing ca. 15% butadiene in the butyl acrylate core.

| Emulsion Notebook # | Type of Sample | Emulsion BI90 PS | Overall Rubber % | Total Shell | Impact | HUNTERLAB L-Value (Black) |
| --- | --- | --- | --- | --- | --- | --- |
| PVC, no modifer | | | | | | 7.1 |
| 3-I | PRIMARY | 71 | 76% | 3 | 40/0 | 6.9 |
| 3-J | PRIMARY | 73 | 83% | 2.3 | 60/0 | 7.1 |
| 3-K | PRIMARY | 73 | 91% | 1.1 | 0/0 | 7.5 |
| 6-L | MICRO | 225 | 91% | 1 | 0/0 | 7.6 |
| 9-L | ENCAPS | 229 | 85.5% | 3 | 0/0 | 7.6 |
| 3-Q | PRIMARY | 216 | 91% | 3.4 | 100/100 | 10.6 |
| 3-S | PRIMARY | 221 | 86% | 5.5 | 100/40 | 10.7 |
| 3-T | PRIMARY | 224 | 83% | 6.7 | 100/50 | 10.8 |
| 3-U | PRIMARY | 227 | 76% | 10.3 | 100/0 | 10.3 |
| 3-V | PRIMARY | 145 | 88% | 3.0 | 100/0 | 8.6 |
| D-200 | | 70 | | | | 7.4 |

NOTE: Impact is % Ductile Breaks on 10 samples at 23 and 15 degrees C. The small emulsion samples, microagglomerated, and encapsulated samples all had excellent color with L-values of 7.1 to 7.6. This is another indication that the microagglomerated and encapsulated samples are re-dispersing to the original core/intermediate shell particle size.

EXAMPLE 15

Impact Modification of a Polyester with a Microagglomerated Core/Intermediate Shell/Final Shell Polymer This example illustrates the utility of such agglomerated polymers as impact modifiers for plastics other than PVC. Poly(butylene terephthalate) (100 parts) may be blended with 10 parts of an agglomerated core/intermediate shell/final shell polymer having a butyl acrylate core and methyl methacrylate shells, such as that of Example 9-N, compounded by extrusion, such as with a 2.54 cm. diameter 24/1 length/diameter screw at an extrusion temperature of 232-274 degrees C., and the pellets so formed may be injection molded with a 42.5 gram reciprocating screw injection molder with an ASTM family mold at a processing temperature of 232-274 degrees C., a mold temperature of 65 degrees C. and a 30-45 second injection molding cycle. The resulting blend will exhibit improved impact over a control molding of the poly(butylene terephthalate) alone.

EXAMPLE 16

Impact Modification of a Polyglutarimide/Polyamide Blend with a Microagglomerated Core/Intermediate Shell/Final Shell Polymer This example illustrates the utility of such agglomerated core-shell polymers as impact modifiers for blends of polymers. Poly(caprolactam), reduced specific viscosity in m-cresol of 1.7, (70 parts) may be blended with 10 parts of a poly(N-methyl dimethylglutarimide) of ca. 76 weight percent imide content and ca. 4.5 percent (acid plus anhydride) functionality, and with 20 parts of an agglomerated core/intermediate shell/final shell polymer having a butyl acrylate core and methyl methacrylate shells, such as that of Example 9-N. The blend may be extruded into pellets in a twin-screw counter-rotating intermeshing screw extruder equipped with a devolatilizing zone at a melt temperature of ca. 270 degrees C. The pellets may then be molded into test pieces in a reciprocating injection molding apparatus at a 40 second time cycle, a melt temperature of ca. 270 degrees C., and a mold temperature of ca. 107 degrees C. The blend will show improved heat distortion temperature and improved impact strength over the polyamide alone.

I claim:

1. A process for preparing a core/shell impact modifier which comprises:
   a) forming by emulsion polymerization a latex of rubbery polymer particles having a glass transition temperature below about −20 degrees C. and a particle size below about 100 nm diameter, the rubbery polymer particle being formed from at least 75 weight percent of units derived from butadiene, $C_2$-$C_8$ lower alkyl esters of acrylic acid, or mixtures thereof;
   b) forming by sequential emulsion polymerization in the presence of the latex of rubbery polymer particle, under conditions wherein essentially no new polymer particles are formed, a latex of first core/intermediate shell polymer particles, the intermediate polymer shell having a glass transition temperature above about −20 degrees C., the intermediate shell being formed predominately from units derived from methyl methacrylate, and the intermediate shell being from about 5% to about 20% by weight of the first core/intermediate shell polymer particles;
   c) agglomerating the latex of first core/intermediate shell polymer particles to form a latex of agglomerated particles of at least 150 nm diameter, the solids content of the latex of first core/intermediate shell polymer particles being no higher than about 40 percent, and the solids content of the latex of agglomerated particles being no higher than about 30%.
   d) forming an encapsulating shell of hard polymer having a glass transition temperature at least 60 degrees C. in a final core/shell polymer by sequential emulsion polymerization onto the agglomerated particles, under conditions wherein essentially no new polymer particles are formed, the encapsulating shell being formed predominately from units derived from methyl methacrylate, the encapsulating shell comprising from about 5 to about 20% by weight of the final core/shell polymers, the total shell content being now lower than about 14% by weight of the final core/shell polymer, the sequential emulsion polymerization being conducted in the latex of the agglomerated particles, and the final core/shell polymer remaining in latex form; and, if desired,
   e) isolating the final core/shell polymer.

2. The process of claim 1 wherein the final core/shell polymer is isolated by spray-drying or coagulation.

3. The process of claim 2 wherein the coagulation is accomplished by addition of an aqueous solution of a salt of an inorganic acid.

4. The process of claim 1 wherein a stabilizer containing one or more antioxidants and/or one or more thermal stabilizers is incorporated into the emulsion of the final core/shell polymer prior to isolation.

5. The process of claim 1 wherein the rubbery polymer particle is formed from at least 80% of units derived from n-butyl acrylate and wherein the rubbery polymer particle further contains units derived from a multi-unsaturated monomer.

6. The process of claim 5 wherein the units derived from the multi-unsaturated monomer are units derived from a multi-unsaturated monomer having two or more unsaturated sites of equal reactivity.

7. The process of claim 5 wherein the units of the multi-unsaturated monomer are units of multi-unsaturated monomer having two or more unsaturated sites of unequal reactivity.

8. The process of claim 1 wherein agglomeration of the first core/intermediate shell latex is accomplished by addition of a dilute solution of an inorganic salt.

9. The process of claim 1 wherein agglomeration of the first core/intermediate shell is accomplished by addition of separate streams of a) an aqueous solution of a weak base; and b) an aqueous solution of a weak acid.

10. The process of claim 9 wherein the weak base is ammonium hydroxide and wherein the weak acid is acetic acid.

11. A process for preparing a toughened thermoplastic resin which comprises:
    a) forming a final core/shell polymer by the process of claim 1; and
    b) blending the final core/shell polymer with a thermoplastic resin under conditions of heat and shear sufficient to cause the final core/shell polymer to disperse into domains of particle size equivalent to those of the particles of the core/intermediate shell polymer or polymers prior to agglomeration.

12. The process of claim 11 wherein the blending is accomplished in an extruder or on a heated multi-roll mill.

13. The process of claim 11 wherein further the toughened thermoplastic resin is processed into a toughened article by extrusion or by injection molding.

14. The process of claim 11 wherein the thermoplastic resin is a homopolymer or copolymer of vinyl chloride or a homopolymer or copolymer of methyl methacrylate.

15. The process of claim 11 wherein the thermoplastic resin is an engineering resin.

16. The process of claim 15 wherein the engineering resin is a polyester of terephthalic acid and an aliphatic glycol, a polyamide, a polycarbonate, a polyglutarimide, an acrylonitrile-butadiene-styrene resin, or a blend of at least two of such resins.

* * * * *

UNITED STATES PATENT AND TRADEMARK OFFICE
CERTIFICATE OF CORRECTION

PATENT NO. : 5,312,575

DATED : MAY 17, 1994

INVENTOR(S) : Morris C. Wills

It is certified that error appears in the above-identified patent and that said Letters Patent is hereby corrected as shown below:

Column 19, line 41, Claim 1 should read:

shell content being no lower than about 14% by

Signed and Sealed this

Seventeenth Day of January, 1995

Attest:

BRUCE LEHMAN

Attesting Officer

Commissioner of Patents and Trademarks